(12) United States Patent
Wang

(10) Patent No.: US 9,104,511 B2
(45) Date of Patent: Aug. 11, 2015

(54) METHOD AND COMPUTATION NODE FOR PROCESSING APPLICATION DATA

(71) Applicant: Huawei Device Co., Ltd., Shenzhen (CN)

(72) Inventor: Qing Wang, Wuhan (CN)

(73) Assignee: Huawei Device Co., Ltd., Shenzhen (CN)

( * ) Notice: Subject to any disclaimer, the term of this patent is extended or adjusted under 35 U.S.C. 154(b) by 125 days.

(21) Appl. No.: 13/665,331

(22) Filed: Oct. 31, 2012

(65) Prior Publication Data

US 2014/0033229 A1 Jan. 30, 2014

(30) Foreign Application Priority Data

Jan. 4, 2012 (CN) .......................... 2012 1 0000757

(51) Int. Cl.
*G06F 9/54* (2006.01)
*H04L 9/32* (2006.01)
*G06F 11/14* (2006.01)

(52) U.S. Cl.
CPC ........ *G06F 9/546* (2013.01); *G06F 9/54* (2013.01); *G06F 11/1458* (2013.01); *H04L 9/3281* (2013.01)

(58) Field of Classification Search
CPC ................................ H04L 9/3281; G06F 9/54
See application file for complete search history.

(56) References Cited

U.S. PATENT DOCUMENTS

| | | | | |
|---|---|---|---|---|
| 4,954,941 A | * | 9/1990 | Redman ........................ | 717/162 |
| 7,631,220 B1 | * | 12/2009 | Hamilton et al. ............... | 714/15 |
| 7,729,690 B1 | * | 6/2010 | Huang et al. ................... | 455/419 |
| 7,836,311 B2 | * | 11/2010 | Kuriya et al. .................. | 713/185 |
| 2002/0156921 A1 | * | 10/2002 | Dutta et al. .................... | 709/246 |
| 2003/0023673 A1 | * | 1/2003 | Tso ................................ | 709/203 |
| 2004/0235523 A1 | * | 11/2004 | Schrire et al. ................. | 455/558 |
| 2005/0010609 A1 | | 1/2005 | Katoh et al. | |

(Continued)

FOREIGN PATENT DOCUMENTS

| | | |
|---|---|---|
| CN | 1573706 A | 2/2005 |
| CN | 1642114 A | 7/2005 |

(Continued)

OTHER PUBLICATIONS

Search Report issued in corresponding PCT Patent Application No. PCT/CN2012/078010, mailed Oct. 18, 2012.

(Continued)

*Primary Examiner* — Charles E Anya
(74) *Attorney, Agent, or Firm* — Brinks, Gilson & Lione

(57) ABSTRACT

The present invention provides a method and a computation node for processing application data. The method includes: starting, by an operating system, a service process; establishing, by the operating system, a socket connection between the service process and backup software, where the service process has a root operation right, and the service process and the backup software have the same user identifier; sending, by the backup software through the socket, a processing request for application data; receiving, by the service process through the socket, the processing request for application data, where the processing request is sent by the backup software, sending the processing request for application data to corresponding application software, receiving application data returned by the corresponding application software, and sending the returned application data to the backup software through the socket.

18 Claims, 4 Drawing Sheets

(56) References Cited

U.S. PATENT DOCUMENTS

| | | |
|---|---|---|
| 2005/0131990 A1* | 6/2005 | Jewell .................... 709/201 |
| 2005/0289381 A1* | 12/2005 | Yeo ................................ 714/1 |
| 2006/0015698 A1* | 1/2006 | Kim et al. ............... 711/162 |
| 2007/0050369 A1* | 3/2007 | Stiegler et al. .............. 707/9 |
| 2007/0198789 A1 | 8/2007 | Clark et al. |
| 2007/0226278 A1* | 9/2007 | Yu et al. ................ 707/204 |
| 2008/0134325 A1* | 6/2008 | Kim et al. ................. 726/21 |
| 2009/0177856 A1 | 7/2009 | Herne |
| 2010/0063960 A1* | 3/2010 | Lehto ..................... 707/621 |
| 2010/0107156 A1 | 4/2010 | Andersen et al. |
| 2010/0269120 A1* | 10/2010 | Manttari et al. ......... 719/313 |
| 2010/0313018 A1* | 12/2010 | Jorgensen ............... 713/168 |
| 2013/0080390 A1* | 3/2013 | Raichstein et al. ...... 707/645 |
| 2013/0173553 A1* | 7/2013 | Apte et al. ............... 707/640 |
| 2013/0173556 A1* | 7/2013 | Grigg et al. ............. 707/667 |

FOREIGN PATENT DOCUMENTS

| | | |
|---|---|---|
| CN | 101588358 A | 11/2009 |
| CN | 101751287 A | 6/2010 |
| CN | 101986266 A | 3/2011 |

OTHER PUBLICATIONS

Office Action issued in corresponding Chinese Patent Application No. 201210000757.1, mailed May 9, 2013, 19 pages.

Wang et al., "Buffer Overflow Attacks on UNIX: Technical Principles, Prevention and Detection" China Academic Journal Electronic Publishing House, Feb. 2000, 3 pages.

"Obtaining the Android Root Right" http://android.linkphone.cn/play/201106/2748.html, Jun. 8, 2011, 6 pages.

Extended European Search Report issued in corresponding European Patent Application No. 12190393.4, mailed May 7, 2013.

* cited by examiner

METHOD AND COMPUTATION NODE FOR PROCESSING APPLICATION DATA

CROSS-REFERENCE TO RELATED APPLICATIONS

This application claims priority to Chinese Patent Application No. 201210000757.1, filed on Jan. 4, 2012, which is hereby incorporated by reference in its entirety.

FIELD OF THE INVENTION

The present invention relates to the field of mobile communications technologies, and in particular, to a method and a computation node for processing application data.

BACKGROUND OF THE INVENTION

Nowadays, the development of new mobile phones becomes faster and faster, and in the process of the development, the loss of application data may be caused due to version upgrading or mobile phone replacement. In order to solve the problem of the loss of application data, backup software may be installed in a mobile phone for backing up the application data on the mobile phone. Application data is data packets of application software. Application software may also be called an application, such as a weather clock and game software. An existing backup technology on an Android mobile phone may be that backup software backs up application data in the Android mobile phone with a root (root) operation right by way of file copying, where software may access each other when the mobile phone has the root operation right, and therefore, the backup software may access the application software, and back up the application data in the application software; or, the application software itself provides a Provider interface to the backup software, and the backup software backs up the application data through the Provider interface.

However, the backup of application data on an Android mobile phone in the prior art either needs the mobile phone to have a root operation right or needs the application software to provide a Provider interface.

SUMMARY OF THE INVENTION

Embodiments of the present invention provide a method and a computation node for processing application data, so as to achieve data backup and recovery when the computation node does not have a root operation right and application software on the computation node does not provide a Provider interface.

An embodiment of the present invention provides a method for processing application data, where the method is applied to a computation node, the computation node including an operating system, and a service process, backup software and application software that run on the operating system, the method including:

starting, by the operating system, the service process;

establishing, by the operating system, a socket (socket) connection between the service process and the backup software, where the service process has a root (root) operation right, and the service process and the backup software have the same user identifier (uid);

sending, by the backup software through the socket, a processing request for application data;

receiving, by the service process through the socket, the processing request for application data, where the processing request is sent by the backup software;

sending, by the service process, the processing request for application data to corresponding application software;

receiving, by the service process, application data returned by the corresponding application software, where the application data is application data returned in response to the processing request; and sending, by the service process through the socket, the returned application data to the backup software.

An embodiment of the present invention provides a computation node, including a hardware layer, an operating system operating on the hardware layer, and a service process, backup software and application software that run on the operating system, and including:

a starting module, configured to enable the operating system to start the service process;

a connection establishing module, configured to enable the operating system to establish a socket (socket) connection between the service process and the backup software, where the service process has a root (root) operation right, and the service process and the backup software have the same user identifier (uid);

a first sending module, configured to enable the backup software to send, through the socket, a processing request for application data;

a first receiving module, configured to enable the service process to receive, through the socket, the processing request for application data, where the processing request is sent by the backup software;

a second sending module, configured to enable the service process to send the processing request for application data to corresponding application software;

a second receiving module, configured to enable the service process to receive application data returned by the corresponding application software, where the application data is application data returned in response to the processing request; and a third sending module, configured to enable the service process to send, through the socket, the returned application data to the backup software.

It may be known from the above technical solutions that, through starting a service process, the embodiment of the present invention may ensure that the service process may access various application software in the computation node, because the service process has a root operation right, and may ensure interactions between the service process and the backup software, because the service process establishes a socket connection with the backup software and has the same uid as the backup software. Therefore, the backup software may interact with the application software through the service process, thereby achieving the backup or recovery of application data in the application software by the backup software.

BRIEF DESCRIPTION OF THE DRAWINGS

To illustrate the technical solutions in the embodiments of the present invention more clearly, the accompanying drawings for describing the embodiments are introduced briefly in the following. Apparently, the accompanying drawings in the following description show some embodiments of the present invention, and persons skilled in the art may derive other drawings from the accompanying drawings without creative efforts.

DETAILED DESCRIPTION OF THE EMBODIMENTS

In order to make the objectives, technical solutions, and advantages of the present invention more comprehensible, the following clearly describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons skilled in the art based on the embodiments of the present invention without creative effects shall fall within the protection scope of the present invention.

Figure 1:
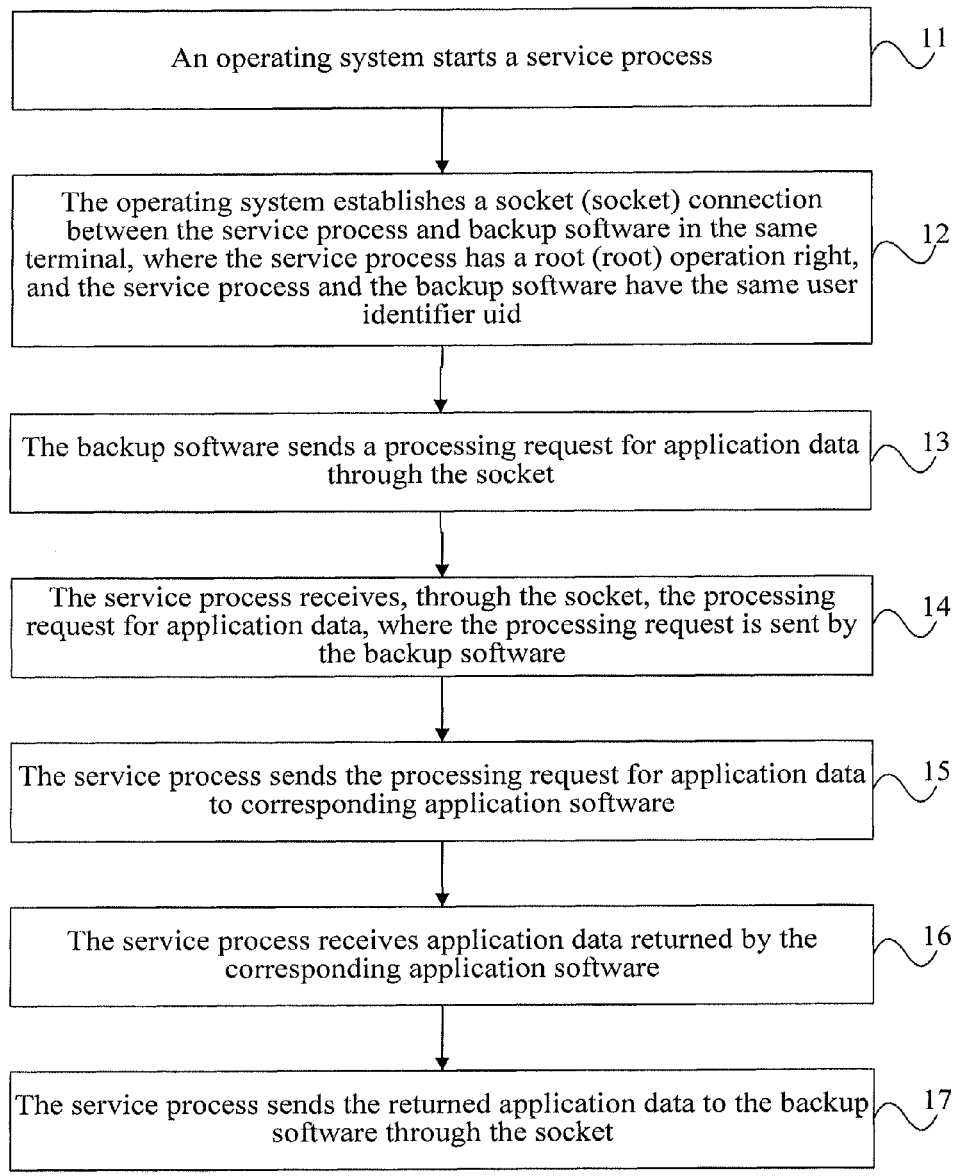
FIG. 1 is a schematic flow chart of one embodiment of a method for processing application data of the present invention.

FIG. 1 is a schematic flow chart of one embodiment of a method for processing application data of the present invention, including, Step 11: An operating system starts a service process.

Step 12: The operating system establishes a socket (socket) connection between the service process and backup software, where the service process has a root (root) operation right, and the service process and the backup software have the same user identifier (User Identifier, uid).

In the embodiment of the present invention, an Android mobile phone being a computation node is taken as an example, where the Android mobile phone may not have a root operation right, and at this time, backup software in the mobile phone cannot interact with application software directly to obtain data from the application software. Besides, the Android mobile phone also may not need the application software to provide a Provider interface, and at this time, the backup software in the mobile phone also cannot obtain data from the application software directly.

When the Android mobile phone does not have a root operation right and the application software does not provide a Provider interface, in order to achieve backup and recovery of application data of the application software, a process may be started at the bottom layer of the mobile phone in the embodiment of the present invention, where the process may be called a service (Service) process.

The service process may be started simultaneously when the backup software is started, or may be started after a particular function in the backup software is started. A specific implementation manner of the service process is to implement a linux process by using C code at the bottom layer of the mobile phone. The linux process is started up through init.rc. The linux process may be called a Service process. Specifically, a service process name may be customized, and a specific operation right may be assigned to the service process to make it have an operation right for reading, writing and deleting the application data; meanwhile, a special UID is assigned to the process, so as to communicate with the backup software. The process is different from a common process in that a specific operation right is assigned, and a special UID is also assigned.

In addition, generally speaking, the operation right corresponding to a started process and the uid of the process may be set in the process of starting the process. In the embodiment of the present invention, referring to FIG. 2, the operation right of the started service process is set as a root operation right, and the uid of the process is the same as the uid of the backup software.

Through setting the operation right of the service process as a root operation right, it may be ensured that the service process can interact with every kind of application software and backup software in the computation node, so that the service process may read application data from the application software and write the read application data into the backup software, and also may write application data into the application software from the backup software. Through setting the uid of the service process to be the same as the uid of the backup software, it may be ensured that the service process and the backup software can interact with each other after a connection is established through a socket, so that the service process may send application data to the backup software, and also may receive application data sent by the backup software. For example, the connection between the service process and the backup software may be established through a command socket/dev/socket/fileback.

Step 13: The backup software sends a processing request for application data through the socket.

Step 14: The service process receives, through the socket, the processing request for application data, where the processing request is sent by the backup software.

Step 15: The service process sends the processing request for application data to corresponding application software.

Step 16: The service process receives application data returned by the corresponding application software.

Step 17: The service process sends the returned application data to the backup software through the socket.

Figure 2:
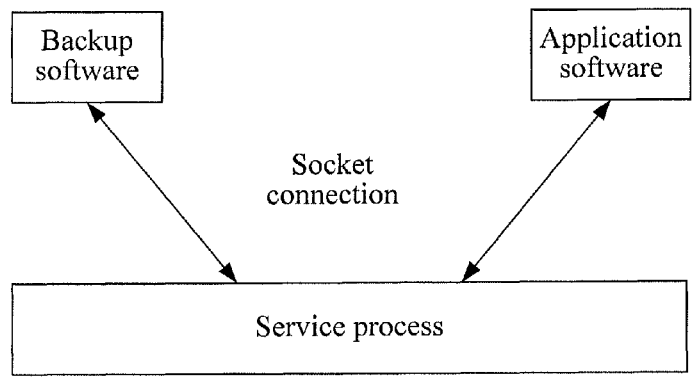
FIG. 2 is a schematic structural diagram of a system in accordance with the present invention.

Referring to FIG. 2, the backup software and the service process may interact with each other through a socket connection, and the service process may interact with the application software because the service process has a root operation right.

Specific commands, data and the like interacted among the backup software, the service process and the application data may be different in accordance with the purpose for backing up data or recovering data, and for a specific interaction flow, reference may be made to the following flows for backup and recovery.

Further, in order to ensure security, the interface between the backup software and the service process and the interface between the service process and the application software may be set to be protected by a signature. At this time, signature verification needs to be performed on the received information first, and then processing is performed after the verification is passed. For example, the service process receives, through the socket, the processing request for application data, where the processing request is sent by the backup software; the service process performs signature verification on the processing request, and then sends the processing request for application data to the corresponding application software after the signature verification is passed. For another example, after receiving the processing request of the service process, the application software performs signature verification first, and then sends application data thereof to the service process after the signature verification is passed. For another example, when receiving the application data returned by the service process, the backup software performs signature verification first, and then saves the application data after the signature verification is passed.

Through starting a service process, this embodiment may ensure that the service process may access various application software in the computation node, because the service process has a root operation right, and may ensure interactions between the service process and the backup software, because the service process establishes a socket connection with the backup software and has the same uid as the backup software. Therefore, the backup software may interact with the application software through the service process, thereby achieving the backup and recovery of application data in the application software by the backup software.

Figure 3:
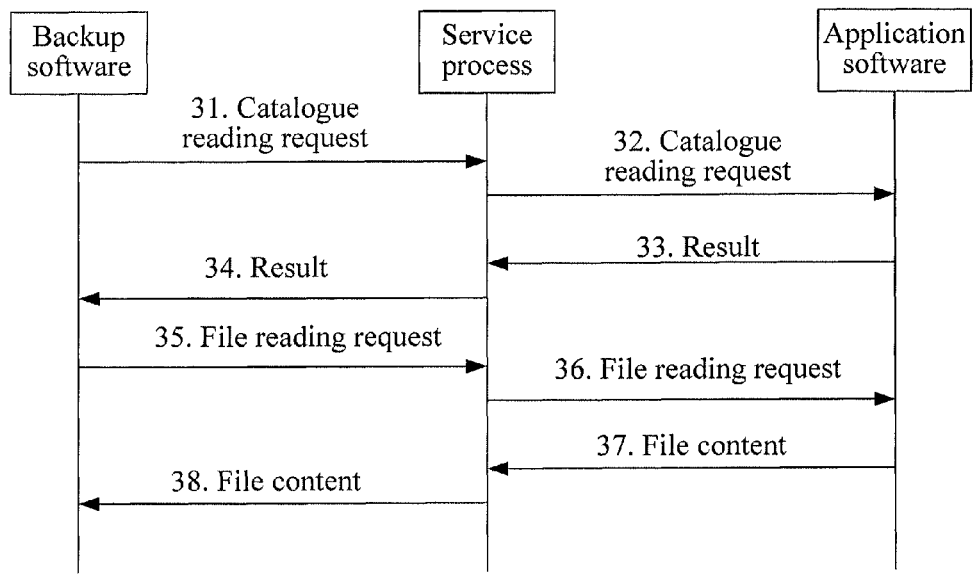
FIG. 3 is a schematic flow chart of another embodiment of the method for processing application data of the present invention.

FIG. 3 is a schematic flow chart of another embodiment of the method for processing application data of the present invention, where this embodiment takes a backup flow as an example. Because the backup software and the service process need to establish a connection first for information interaction, it should be understood that the following steps included by this embodiment are after the steps of starting the service process and establishing the socket connection between the service process and the backup software.

The processing request for application data includes a catalogue reading request or a file reading request, and accordingly, the application data returned by the corresponding application software includes catalogue information that is read or file content that is read. The whole flow for reading the application data is described in detail below.

Referring to FIG. 3, the flow includes:

Step 31: The backup software sends a catalogue reading request to the service process through the socket connection.

When the backup software sends a command word and a parameter to the service process, the backup software may send lengths of the command word and the parameter to the service process first, and then send specific content of the command word and the parameter.

For example, when a catalogue reading request is sent, the catalogue reading request may be expressed as opendir+catalogue, where "opendir" is a command word, and "catalogue" is a catalogue path parameter. At this time, the length of "opendir+catalogue" may be sent first, where the length may be expressed in the form of unsigned short 16 bit (unsigned short 16 bit), and then, "opendir+catalogue" may be sent.

Step 32: The service process sends the catalogue reading request to the corresponding application software according to the catalogue reading request.

The service process may read content of a corresponding length according to the received lengths of the command word and the parameter, and determine the content as the specific content of the command word and the parameter, that is, determine the specific content of the catalogue reading request.

For example, the catalogue reading request carries information of a catalogue, such as the catalogue path parameter catalogue, and the service process may obtain a handle of the catalogue according to the information of the catalogue, and then send the catalogue reading request to the application software indicated by the handle.

Step 33: The application software returns a result to the service process.

The returned result may be all files and related attributes under the catalogue. For example, if the catalogue reading request sent by the backup software is for reading a catalogue of application software A, application software A returns the catalogue included by application software A to the service process, such as file information included by catalogue 1, file information included by catalogue 2 and file information included by catalogue 3. It should be understood that because a catalogue reading request is generally for reading one catalogue each time, the returned result is generally information related to one catalogue.

Step 34: The service process sends read content to the backup software through the socket connection.

The read content may be the information of the catalogue included in the result returned to the service process by the application, such as the file information included by catalogue 1, the file information included by catalogue 2 and the file information included by catalogue 3.

Furthermore, the service process may store the read content in a buffer (buffer), and then send, to the backup software, the data stored in the buffer, that is, the read content. The buffer may be construed as a data field for storing data.

In addition, the service process may send a length of the read content first, where the length may be expressed in the form of unsigned short 16 bit (unsigned short 16 bit), and then send the read content to the backup software. The backup software reads data of a corresponding length according to the length of the read content, and then the backup software may back up the read data.

Step 35: The backup software sends a file reading request to the service process.

Similarly to the catalogue reading request, the backup software may send a length of the file reading request first, and then send specific content of the file reading request.

Step 36: The service process sends the file reading request to the corresponding application software.

The file reading request sent by the backup software carries file information, for example, the file reading request is open+file path, where the file path may indicate path information of a file to be opened. Then, the service process may find corresponding application software from the file path in the file reading request.

Step 37: The application software returns a result to the service process.

The returned result may include content related information of the file, such as content of the file, a format of the file and an operation right of the file.

Step 38: The service process returns the content of the file to the backup software.

For example, the returned content of the file includes the content of the file, the format of the file, the operation right of the file and so on.

Through starting the service process in this embodiment, the service process may read data from the application software and send the data to the backup software, and the backup software backs up the data, so as to achieve the processing of data backup.

Figure 4:
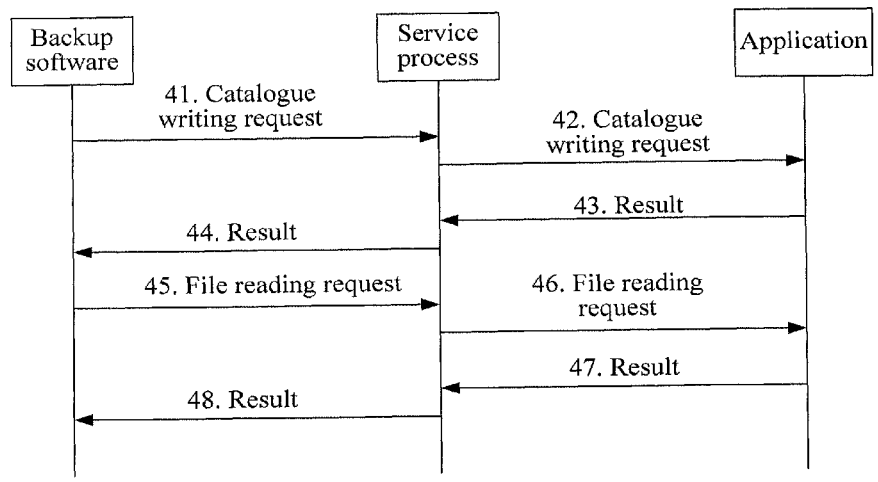
FIG. 4 is a schematic flow chart of another embodiment of the method for processing application data of the present invention.

FIG. 4 is a schematic flow chart of another embodiment of the method for processing application data of the present invention, where this embodiment takes a recovery flow as an example. Because the backup software and the service process need to establish a connection first for information interaction, it should be understood that the following steps included by this embodiment are after the steps of starting the service process and establishing the socket connection between the service process and the backup software.

The processing request for application data includes a catalogue writing request or a file writing request, and accordingly, the application data returned by the corresponding application software includes a result corresponding to the catalogue writing request or a result corresponding to the file writing request. The whole flow for recovering the application data is described in detail below.

Referring FIG. 4, the flow includes:

Step 41: The backup software sends a catalogue writing request to the service process through the socket connection.

When sending a catalogue writing request, similar to the processing of the catalogue reading request, the backup software may send a length of the catalogue writing request first, and then send specific content of the catalogue writing request.

In addition, the specific content of the catalogue writing request may include file information included by every catalogue, for example, catalogues include catalogue 1, catalogue 2, catalogue 3, and so on, and catalogue 1 includes file 1, file 2, and so on. Optionally, because catalogue writing is generally writing one catalogue each time, the catalogue writing request generally includes information of one catalogue. For example, the format of the catalogue writing request is: writeDir+catalogue name. In addition, multiple catalogues may be put in a same request, and separated by special characters, for example, the format of the catalogue writing request is: writeDir+catalogue name 1; catalogue name 2; catalogue name 3.

Step 42: The service process sends the catalogue writing request to the corresponding application software according to the catalogue writing request.

The service process may determine a corresponding handle according to the catalogue name included in the catalogue writing request, and then send the catalogue writing request to the application indicated by the corresponding handle, where the catalogue writing request may include the file information included in the catalogue.

For example, a catalogue writing request is sent to application A, where the catalogue writing request carries and includes catalogue 1, catalogue 2, catalogue 3, and so on, and catalogue 1 includes file 1, file 2, and so on.

Step 43: The application software returns a result to the service process.

Step 44: The service process returns the result to the backup software.

The result in steps 43-44 may be information indicating whether the catalogue writing is successful.

Step 45: The backup software sends a file writing request to the service process.

The format of the file writing request may be write+file name+file content.

The file content may be data that is already backed up by the backup software in the manner shown in FIG. 3.

Step 46: The service process sends the file writing request to the corresponding application software.

The service process may determine a corresponding catalogue according to the file name after receiving the file writing request. For example, because operations performed on each of the catalogues are generally serial, operations are only performed on a certain catalogue currently, so that if a writing operation is performed on catalogue B currently, the service process sends a file writing request to application A which is corresponding to catalogue B. Optionally, if operations may be performed in parallel on each of the catalogues, and file names corresponding to the catalogues may be the same, the file writing request sent by the backup software may also carry information of a catalogue, so as to write corresponding file content into a correct catalogue.

Step 47: The application software returns a result to the service process.

Step 48: The service process returns the result to the backup software.

The result in steps 47-48 may be information indicating whether the file writing is successful. After the recovery is completed, the socket (socket) connection may be removed, and the service process may be closed.

After determining that the recovery operation is completed, the backup software may instruct the service process to be closed, for example, through a command close+content and/or file path.

Through starting the service process in this embodiment, the service process may receive data backed up by the backup software, and send the backed up data to the application software, so as to achieve the processing of data recovery.

Figure 5:
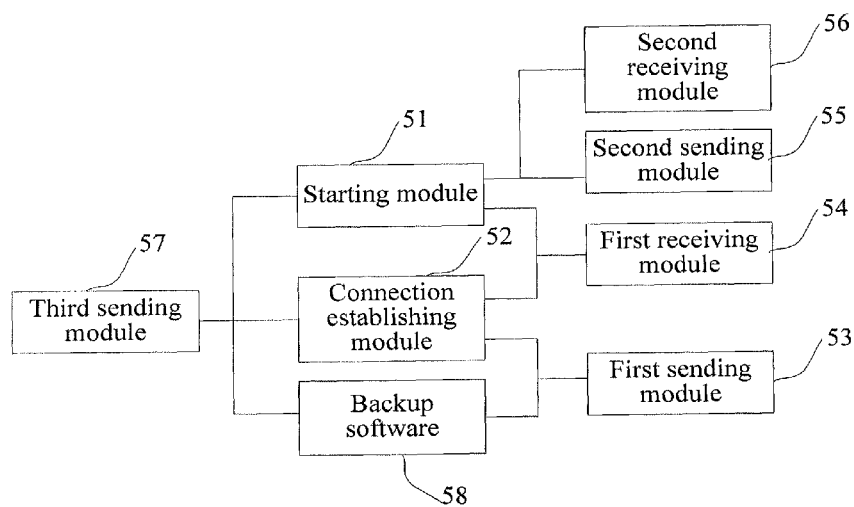
FIG. 5 is a schematic structural diagram of one embodiment of a computation node of the present invention.

FIG. 5 is a schematic structural diagram of one embodiment of a computation node of the present invention, including a starting module 51, a connection establishing module 52, a first sending module 53, a first receiving module 54, a second sending module 55, a second receiving module 56 and a third sending module 57. The starting module 51 is configured to start a service process. The connection establishing module 52 is configured to establish a socket (socket) connection between the service process and backup software, where the service process has a root (root) operation right, and the service process and the backup software have the same user identifier (uid). The first sending module 53 is configured to enable the backup software to send, through the socket, a processing request for application data. The first receiving module 54 is configured to enable the service process to receive, through the socket, the processing request for application data, where the processing request is sent by the backup software. The second sending module 55 is configured to enable the service process to send the processing request for application data to corresponding application software. The second receiving module 56 is configured to enable the service process to receive application data returned by the corresponding application software. The third sending module 57 is configured to enable the service process to send, through the socket, the returned application data to the backup software.

It should be noted that the starting module 51 and the connection establishing module 52 may be implemented by an operating system, the first sending module 53 may be implemented by backup software, and the first receiving module 54, the second sending module 55, the second receiving module 56 and the third sending module 57 may be implemented by a service process.

Figure 6:
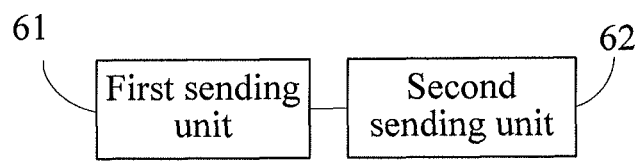
FIG. 6 is a schematic structural diagram of another embodiment of the computation node of the present invention.

Optionally, referring to FIG. 6, the first sending module includes a first sending unit 61 and a second sending unit 62. The first sending unit 61 is configured to enable the backup software to send, through the socket, a length of the processing request for application data. The second sending unit 62 is configured to enable the backup software to send, through the socket, specific content corresponding to the length of the processing request for application data.

Figure 7:
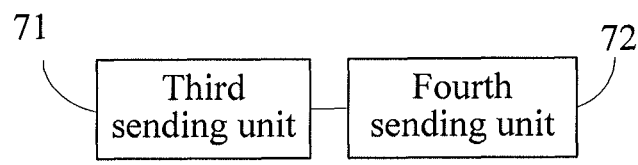
FIG. 7 is a schematic structural diagram of another embodiment of the computation node of the present invention.

Optionally, referring to FIG. 7, the third sending module includes a third sending unit 71 and a fourth sending unit 72. The third sending unit 71 is configured to enable the service process to send, through the socket, a length of the returned application data to the backup software. The fourth sending unit 72 is configured to enable the service process to send, through the socket, specific content of the returned application data to the backup software.

Figure 8:
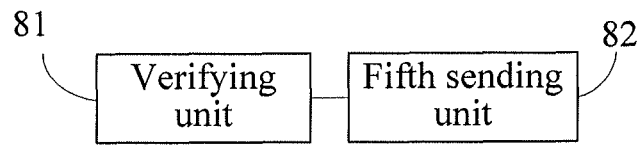
FIG. 8 is a schematic structural diagram of another embodiment of the computation node of the present invention.

Optionally, referring to FIG. 8, the second sending module includes a verifying unit 81 and a fifth sending unit 82. The verifying unit 81 is configured to enable the service process to perform signature verification on the processing request. The fifth sending unit 82 is configured to send the processing request for application data to the corresponding application software if the signature verification is passed.

Through starting a service process, this embodiment may ensure that the service process may access various application software in the computation node, because the service process has a root operation right, and may ensure interactions between the service process and the backup software, because the service process establishes a socket connection with and has the same uid as the backup software. Therefore, the backup software may interact with the application software through the service process, thereby achieving the backup or recovery of application data in the application software by the backup software.

It should be noted that the computation node may be a mobile terminal, and the mobile terminal may implement the backup and recovery functions in the embodiments described above, which is not described in detail here again.

Persons skilled in the art should understand that all or part of the steps of the method specified in any embodiment of the present invention may be implemented by a program instructing relevant hardware. The program may be stored in a computer readable storage medium. When the program runs, the program executes the steps of the method specified in the above embodiment. The storage medium may be any medium capable of storing program codes, such as ROM, RAM, magnetic disk, or CD-ROM.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications may be made to the technical solutions described in the foregoing embodiments, or equivalent replacements may be made to some technical features in the technical solutions, as long as such modifications or replacements do not cause the essence of corresponding technical solutions to depart from the scope of the technical solutions of each embodiment of the present invention.

What is claimed is:

1. A method for processing application data, applied to a mobile computation node, the mobile computation node comprising an operating system, wherein the method comprising:
    providing a service process, a backup software and an application software running on the operating system within the mobile computation node;
    determining whether a root operation right and a provider interface are provided;
    in response to determining that the root operation right and the provider interface are not provided:
    starting, by the operating system, the service process;
    setting the root operation right of the service process;
    establishing, by the operating system, a socket connection between the service process and the backup software, wherein the service process has the root operation right;
    setting a user identifier (uid) for the service process and the backup software to the same user identifier;
    performing a signature verification on a processing request;
    sending, by the backup software through the socket, a length of the processing request for application data after the signature verification passes;
    determining, based on the length of the processing request, a specific content for the application data;
    sending, by the backup software through the socket, the specific content;
    receiving, by the service process through the socket, the processing request for application data, wherein the processing request is sent by the backup software;
    sending, by the service process, the processing request for application data to corresponding application software;
    receiving, by the service process, application data returned by the corresponding application software, wherein the application data is application data returned in response to the processing request; and
    sending, by the service process through the socket, the returned application data to the backup software.

2. The method according to claim 1, wherein the sending, by the service process through the socket, the returned application data to the backup software specifically comprises:
    sending, by the service process through the socket, a length of the returned application data to the backup software; and
    sending, by the service process through the socket, specific content of the returned application data to the backup software.

3. The method according to claim 2, wherein the processing request for application data comprises a catalogue reading request or a file reading request, and accordingly, the application data returned by the corresponding application software comprises catalogue information that is read or file content that is read.

4. The method according to claim 2, wherein the processing request for application data comprises a catalogue writing request or a file writing request, and accordingly, the application data returned by the corresponding application software comprises a result corresponding to the catalogue writing request or a result corresponding to the file writing request.

5. The method according to claim 1, wherein the sending, by the service process through the socket, the returned application data to the backup software specifically comprises:
    sending, by the service process through the socket, a length of the returned application data to the backup software; and
    sending, by the service process through the socket, specific content of the returned application data to the backup software.

6. The method according to claim 5, wherein the processing request for application data comprises a catalogue reading request or a file reading request, and accordingly, the application data returned by the corresponding application software comprises catalogue information that is read or file content that is read.

7. The method according to claim 5, wherein the processing request for application data comprises a catalogue writing request or a file writing request, and accordingly, the application data returned by the corresponding application software comprises a result corresponding to the catalogue writing request or a result corresponding to the file writing request.

8. The method according to claim 1, wherein the processing request for application data comprises a catalogue reading request or a file reading request, and accordingly, the application data returned by the corresponding application software comprises catalogue information that is read or file content that is read.

9. The method according to claim 1, wherein the processing request for application data comprises a catalogue reading request or a file reading request, and accordingly, the application data returned by the corresponding application software comprises catalogue information that is read or file content that is read.

10. The method according to claim 1, wherein the processing request for application data comprises a catalogue writing request or a file writing request, and accordingly, the application data returned by the corresponding application software comprises a result corresponding to the catalogue writing request or a result corresponding to the file writing request.

11. The method according to claim 1, wherein the processing request for application data comprises a catalogue writing request or a file writing request, and accordingly, the application data returned by the corresponding application software comprises a result corresponding to the catalogue writing request or a result corresponding to the file writing request.

12. The method according to claim 1, wherein the sending, by the service process, the processing request for application data to the corresponding application software specifically comprises:
performing, by the service process, the signature verification on the processing request; and
if the signature verification is passed, sending the processing request for application data to the corresponding application software.

13. A mobile computation node, comprising a hardware layer, an operating system operating on the hardware layer, wherein the mobile computation node comprising:
a service process, a backup software and an application software running on the operating system within the mobile computation node wherein the service process has a root operation right and the backup software is provided a provider interface;
a starting module, configured to enable the operating system to start the service process and set the root operation right of the service process;
a connection establishing module, configured to enable the operating system to establish a socket connection between the service process and the backup software, wherein the service process has the root operation right, set a user identifier (uid) for the service process and the backup software to the same user identifier, and perform a signature verification on a processing request;
a first sending module, configured to enable the backup software to send, through the socket, a length of the processing request for application data after the signature verification passes, determine, based on the length of the processing request, a specific content for the application data, and send, by the backup software through the socket, the specific content;
a first receiving module, configured to enable the service process to receive, through the socket, the processing request for application data, wherein the processing request is sent by the backup software;
a second sending module, configured to enable the service process to send the processing request for application data to corresponding application software;
a second receiving module, configured to enable the service process to receive application data returned by the corresponding application software, wherein the application data is application data returned in response to the processing request; and
a third sending module, configured to enable the service process to send, through the socket, the returned application data to the backup software.

14. The mobile computation node according to claim 13, wherein the third sending module comprises:
a third sending unit, configured to enable the service process to send, through the socket, a length of the returned application data to the backup software; and
a fourth sending unit, configured to enable the service process to send, through the socket, specific content of the returned application data to the backup software.

15. The mobile computation node according to claim 13, wherein the third sending module comprises:
a third sending unit, configured to enable the service process to send, through the socket, a length of the returned application data to the backup software; and
a fourth sending unit, configured to enable the service process to send, through the socket, specific content of the returned application data to the backup software.

16. The computation node according to claim 13, wherein the second sending module specifically comprises:
a verifying unit, configured to enable the service process to perform the signature verification on the processing request; and
a fifth sending unit, configured to send the processing request for application data to the corresponding application software if the signature verification is passed.

17. The computation node according to claim 13, wherein the second sending module specifically comprises:
a verifying unit, configured to enable the service process to perform the signature verification on the processing request; and
a fifth sending unit, configured to send the processing request for application data to the corresponding application software if the signature verification is passed.

18. The mobile computation node according to claim 13, wherein the mobile computation node is a mobile terminal.

* * * * *